March 20, 1928.
D. H. YAKE
1,663,327
SAFETY DOG FOR TRUCKS AND CARS
Filed Feb. 14, 1927
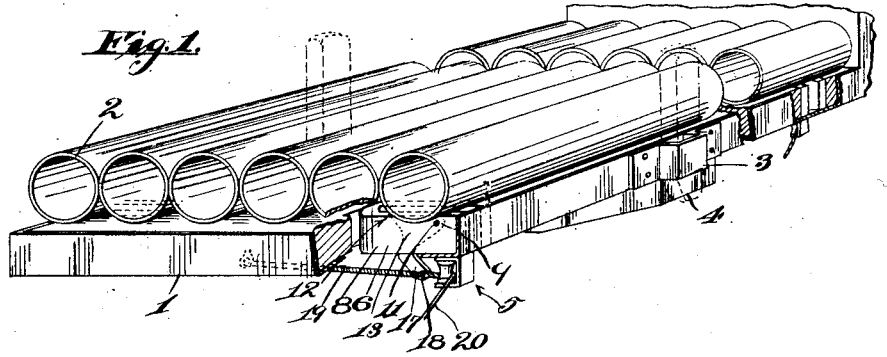
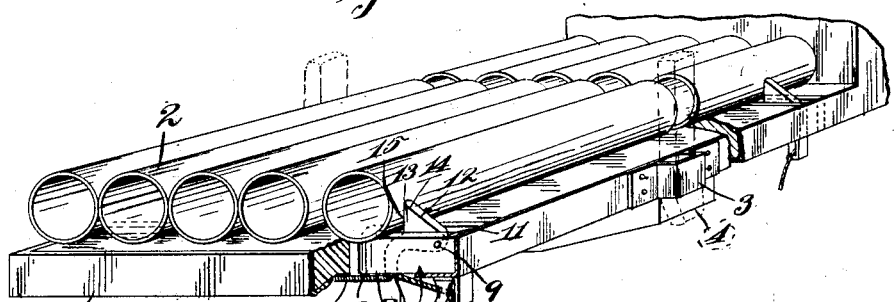
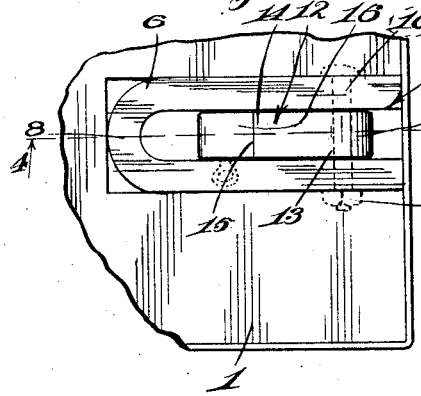
Inventor
D. H. Yake
by Miller
Attorneys Patented Mar. 20, 1928.

1,663,327

UNITED STATES PATENT OFFICE.

DAVID H. YAKE, OF LOS ANGELES, CALIFORNIA, ASSIGNOR OF ONE-HALF TO OTIS SCOTT, OF WHITTIER, CALIFORNIA.

SAFETY DOG FOR TRUCKS AND CARS.

Application filed February 14, 1927. Serial No. 168,063.

This invention relates to safety dogs for trucks, cars and the like, and it is an object of this invention to provide a dog that will retain objects on the platform of a truck or the like.

A second object of my invention is to provide a dog which may be applied to a truck, and which has means whereby the same may be released in order to enable objects resting upon the platform of a truck to be removed therefrom.

A third object of my invention is to provide a dog which consists of a housing to be embedded in the platform of a truck or the like having a latch thereon and a pulley to be attached to the body of the truck adjacent the housing, so that a cord which is attached to the latch and passed through the pulley, may be pulled and the latch released, thereby enabling sliding or rolling objects to pass over the surface of the latch and be removed from the truck.

A still further object of my invention is to provide a device which is simple in its construction and design, which is easy to operate, inexpensive to manufacture, strong and durable in its construction, is not likely to get out of order and is well adapted to perform the services required of it.

With the above and other objects in view which will appear as the description proceeds, my invention consists in the construction and arrangement of parts hereinafter described and claimed.

In the accompanying drawing which forms a part of this specification, Figure 1 is a perspective view of a portion of a truck, such portion comprising the platform of said truck and showing a plurality of tubular objects thereon being held or centered upon the truck by means of a plurality of my safety dog.

Figure 2 is a similar perspective view of the platform of a truck showing one of these tubular objects resting upon the latch which is released in a position where the same may be readily removed.

Figure 3 is a plan view of my safety dog assembly shown embedded in a portion of the platform of a truck, and Figure 4 is a side sectional view taken upon the lines 4—4 of Figure 3.

Referring to the accompanying drawings wherein similar reference characters designate similar parts throughout, 1 designates the body or platform of a truck. The reference character 2 designates a plurality of tubular objects resting upon the platform of the truck. Designated at 3 is a bracket designed to receive a side support 4 shown in dotted lines. This bracket and side support is the conventional method of retaining objects on the body of a truck. No claim is laid to this bracket or side support, the same being merely shown to illustrate a point hereinafter expressed in this specification. The reference character 5 designates as an entirety, my improved safety dog, and the operative connections associated therewith. This safety dog comprises in combination a latch assembly 6 and a pulley assembly 7, which pulley assembly is located on the truck at a point adjacent the latch assembly. The latch assembly is adapted to be embedded in the body of the truck and comprises a horse-shoe or U-shaped member 8 having provided on the parallel arms of the same a pair of aligned apertures 9 and 10, said apertures provided by virtue of the pivot pin 11, means whereby the latch member 12 may be pivoted within the dimensions of said U-shaped member. The latch member 12 consists of a body portion 13 which presents an inclined surface 14 which is inclined upwardly and inwardly toward the center of the platform. The latch member also presents a vertical or upright edge 15 at the base of which there is a rounded surface 16 forming a shoulder. This shoulder is provided by a depending arm 17. The depending arm 17 is designed to receive an eyelet, staple, hook or other attaching means 18 to which is attached one end of a coil spring 19 and one end of a rope, cord, chain or other flexible line 20. The other end of the coil spring 19, which is a tension spring, is attached to an eyelet or the like located on a stationary portion of the truck, which attaching means is designated at 21. Associated with my latch assembly and forming a commercial part of my improved safety dog assembly and adapted to be sold in connection with the same, is a pulley assembly comprising a square U-shaped member 30 having a hyperbolic pulley 31 pivoted between the parallel arms of the same by means of a suitable pivot pin 32, which pivot pin is threaded at one end thereof, and which threaded end projects through a flange of the truck body and is receivable in a threaded aperture in the U-shaped member 8. This pin consequently performs a double function. It holds the hyperbolic pulley in position and it also serves to hold the U-shaped member 8 firmly on one flange of the channel arm I of the truck platform 1. Additional securing means receivable in an arm of the horse-shoe member 8 is indicated at 35.

Having described in detail the operative parts of my invention as shown applied to a truck platform, I will now proceed with the description of the operation of my device in the field. When the sliding or rolling objects 2 are placed upon the truck in the manner shown, they are held centered upon the truck by means of the flat faces 15 of a plurality of my latches which are located around the periphery of the truck. If any of the pipes or similar objects as shown on the drawing should start to roll off of the truck platform before intended the outermost pipe will engage the vertical surface 15, tending to swing the latch member about the pivot 11 until the surface 16 provided on the shoulder at the base of the surface 15 strikes or encounters the bottom of the pipe. The pipe in this manner will engage two surfaces, namely 15 and 16 which are on opposite sides of a radial line from the pivot 11. In this manner the dog can not be reversely rotated to allow the pipes to roll off of the truck platform. If it is desired to remove one of these sliding or rolling objects, the operator or truckman applies tension to the cord 20, thereby swinging the latch so that the edge 16 lies in the same plane as the upper surface of the truck platform, and the objects are then permitted to roll over the latch whereby they may be removed from the truck. If the objects are to be removed from the truck one at a time, my improved safety dog materially effects a saving of time and labor, especially if the truck may be so positioned by the driver that it is at a slight incline laterally. In the above described construction, if a workman is standing on the platform and wishes to depress one of the dogs, it is perfectly possible for him to do so by merely stepping on the inclined surface 14, forcing the dog downwardly against the action of the spring 19. It is not necessary that the cable or cord 20 be pulled whenever it is desired to move the dog downwardly. If a conduit is being laid along the highway or the like, the operator may drive a truck alongside the unearthed trench, and at positions along said trench he may stop his truck, release the latch 13 by means of the cord 20 until one of the tubular objects has rolled over the same and off the side of the truck. He may then proceed a short distance along the trench and repeat the operation, each time allowing one of the tubular objects or conduits to drop to the ground. My safety dog is an improvement of the ordinary type of dog now in general use. This type is illustrated by the bracket 3 in which is adapted to be inserted, a side support 4. The support 4 usually becomes firmly embedded in the bracket 3, and it is with considerable difficulty that the truckman or operator is able whenever he wishes to deposit an object on the ground, to release the support 4 from the bracket 3.

It will be understood that various changes in the detail of construction may be made without departing from the spirit or scope of the invention as defined by the appended claims.

I claim:

1. A safety dog for truck platforms and the like, comprising a housing adapted to be embedded in said platform, a latch pivoted in said housing and means for normally urging said latch into a position projecting above said platform.

2. A safety dog for truck platforms and the like, comprising in combination a U-shaped member adapted to be embedded in said platform, a latch pivoted between the arms of said U-shaped member, an arm on said latch, a spring connected to said arms and to a stationary point on said platform and means for withdrawing said latch from above said platform.

3. A safety dog comprising in combination a U-shaped member, a latch member pivoted between the arms of said U-shaped member, a lateral arm on said latch member, a spring connected to said lateral arm and to a stationary point, a cord attached to said arm, and a pulley through which said cord extends as and for the purpose specified.

4. A safety dog for truck platforms and the like comprising a dog pivoted within an opening in the top of the truck platform, said dog normally projecting above the platform to prevent articles on the platform from moving thereover off of the platform, said dog being capable of being forced downward by applying a downward force to the upper portion thereof so as to assume a position below the top surface of the platform to permit articles on the platform to be passed thereover.

5. A safety dog for truck platforms and the like comprising a dog pivoted within an opening in the top of the truck platform, said dog normally projecting above the platform to prevent articles on the platform from moving thereover off of the platform, said dog being capable of being forced downward by applying a downward force to the upper portion thereof so as to assume a position below the top surface of the platform to permit articles on the platform to be passed thereover, and spring means urging said dog into its upper position.

6. A safety dog for truck platforms and the like comprising a dog pivoted at its outer end within an opening in the platform, said dog presenting an upright inner surface, and an outer surface which is inclined upwardly and inwardly toward the center of the platform, said dog normally assuming a position above the platform but being capable of being moved into a position below the top surface of the platform.

7. A safety dog for truck platforms and the like comprising a dog pivoted at its outer end within an opening in the platform, said dog presenting an upright inner surface, and an outer surface which is inclined upwardly and inwardly toward the center of the platform, said dog normally assuming a position above the platform but being capable of being moved into a position below the top surface of the platform, and spring means urging the dog into its normal position.

8. A safety dog for truck platforms and the like comprising a dog pivoted at its outer end within an opening in the platform, said dog presenting an upright inner surface which is located toward the center of the platform from the pivot, said dog carrying an arm at the base of the upright surface which extends toward the center of the platform thus forming a shoulder at the base of the upright surface, said dog normally assuming a position above the platform but being capable of being moved to a position below the top surface of the platform.

9. A safety dog for truck platforms and the like comprising a dog pivoted at its outer end within an opening in the platform, said dog presenting an upright inner surface which is located toward the center of the platform from the pivot, said dog carrying an arm at the base of the upright surface which extends toward the center of the platform thus forming a shoulder at the base of the upright surface, said dog normally assuming a position above the platform but being capable of being moved to a position below the top surface of the platform, and spring means urging the dog into its upper position.

In testimony whereof I have signed my name to this specification.

DAVID H. YAKE.